No. 674,425. Patented May 21, 1901.
L. NILSON.
BRUSH CUTTING MACHINE.
(Application filed Nov. 10, 1900.)

(No Model.) 2 Sheets—Sheet 1.

Louis Nilson Inventor

Witnesses
Edwin G. McKee
Louis G. Julihn

By
Attorney

THE NORRIS PETERS CO., PHOTO-LITHO., WASHINGTON, D. C.

No. 674,425. Patented May 21, 1901.
L. NILSON.
BRUSH CUTTING MACHINE.
(Application filed Nov. 10, 1900.)
(No Model.) 2 Sheets—Sheet 2.
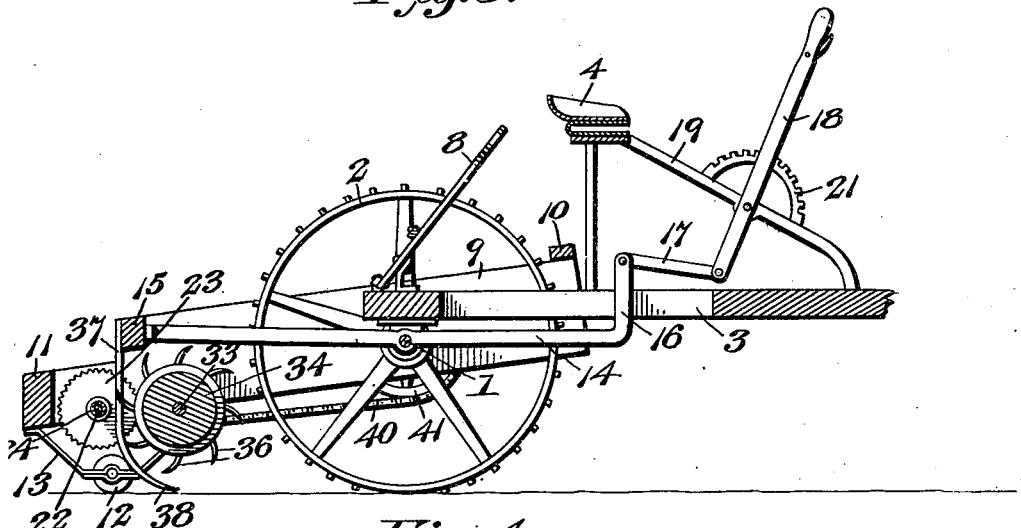
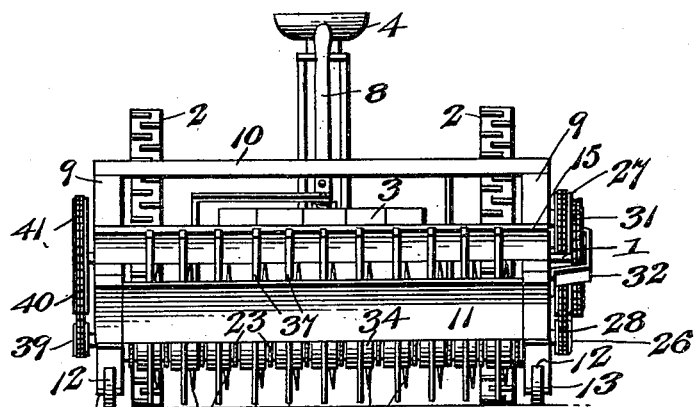
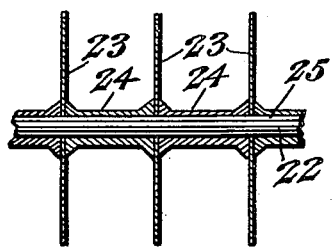
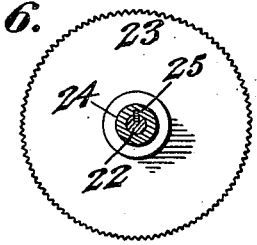
Louis Nilson Inventor

UNITED STATES PATENT OFFICE.

LOUIS NILSON, OF FRESNO, CALIFORNIA.

BRUSH-CUTTING MACHINE.

SPECIFICATION forming part of Letters Patent No. 674,425, dated May 21, 1901.

Application filed November 10, 1900. Serial No. 36,122. (No model.)

*To all whom it may concern:*

Be it known that I, LOUIS NILSON, a citizen of the United States, residing at Fresno, in the county of Fresno and State of California, have invented a new and useful Brush-Cutting Machine, of which the following is a specification.

My present invention relates to a novel brush-cutting machine, the object being to produce an implement by means of which stalks, prunings, or other similar vegetation may be cut into small pieces to facilitate the utilization of such vegetation as a fertilizer. In certain classes of agricultural pursuits— as, for instance, in vineyards—the vines are usually pruned, and the prunings are then collected and burned. It is a fact well recognized that this debris when turned under is an excellent fertilizer; but it has ordinarily been wasted because of the difficulty of plowing it into the soil. My invention therefore is directed to the production of a machine which when drawn over the ground covered with prunings, stalks, or other similar vegetation will cut such debris into proper shape to permit of its being turned under or plowed in, thus saving the cost of the labor ordinarily employed in gathering and burning this heretofore waste material and also saving the cost of a considerable amount of fertilizer.

To the accomplishment of this end the invention consists in the construction and arrangement of parts to be hereinafter more fully described, illustrated in the accompanying drawings, and defined in the appended claims.

Figure 1:
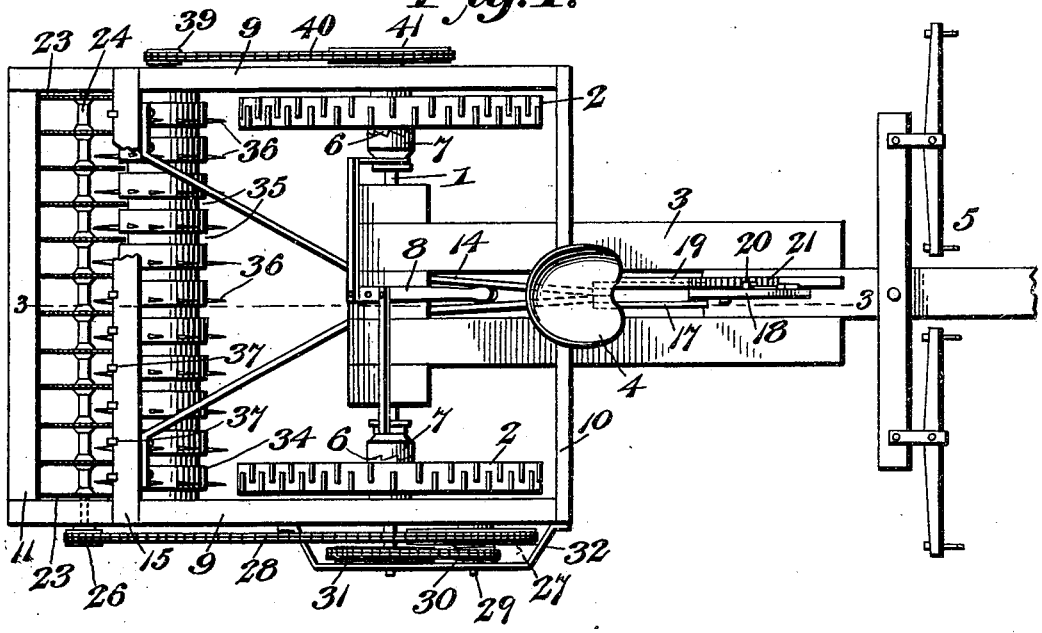
Figure 2:
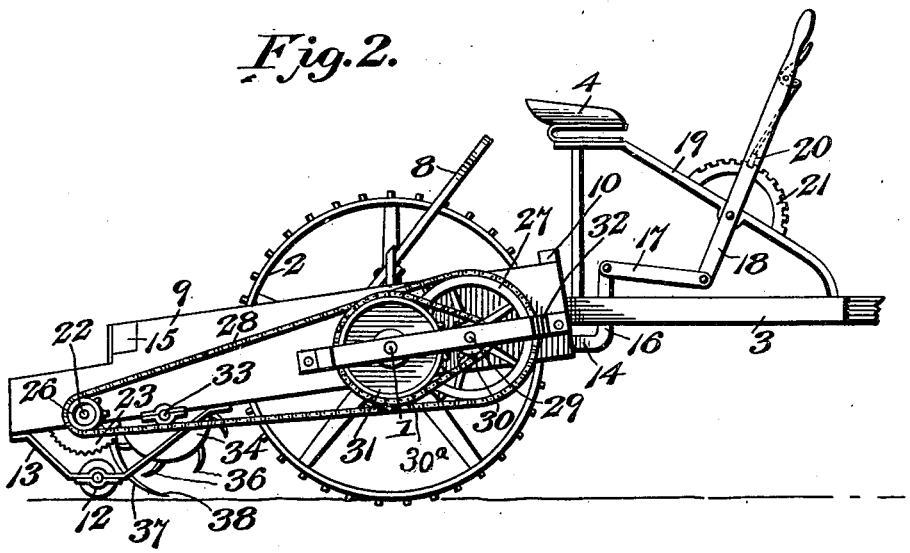

In said drawings, Figure 1 is a top plan view of my machine complete. Fig. 2 is a side elevation thereof. Fig. 3 is a central longitudinal section on the line 3 3 of Fig. 1. Fig. 4 is a rear elevation. Fig. 5 is a detail view of the cutter-shaft and cutters, and Fig. 6 is a sectional view through the cutter-shaft.

Referring to the numerals employed to designate corresponding parts throughout the views, 1 indicates the main supporting-shaft of my machine, equipped with carrying-wheels 2 and supporting at its middle the rear end of the main frame 3, carrying the driver's seat 4, and to which the draft appliance 5 is attached. The carrying-wheels 2 are mounted loosely on the shaft 1, but are provided with hubs 6, formed with clutch-faces for engagement by clutch-collars 7, controlled, through suitable ordinary connections, by a clutch-lever 8, located at the rear of the frame 3. The clutch lever and collars, with their connected parts, constitute means for throwing the carrying-wheels into or out of connection with the shaft 1 to permit the loose running of the wheels when it is desired to transport the device from one point of use to another or to effect such connection when it is desired to drive the shaft by traction in order to communicate motion to the operative parts of the machine as the latter is drawn over the ground by the draft-animals. Beyond the wheels 2 the shaft 1 supports the side bars 9 of what may be termed a "tilting frame," comprising said side bars and the transverse end bars 10 and 11 at the front and rear ends of the frame, the bar 10 being secured to the upper edges of the side bars of the frame in order to permit tilting of the latter without interference from the main frame 3. This tilting or auxiliary frame is carried somewhat nearer its front end in order that the rear end thereof may be supported in large measure upon the ground by small traveler wheels or rollers 12, journaled in brackets 13, pendent upon the side bars 9. The tilting frame serves as a carriage for those parts of the machine which coöperate to effect the lifting, cutting, and redepositing of the vegetation, and it is tiltably mounted in order that it may be connected to the main frame by adjusting mechanism which will serve to effect a balance between the two frames and to permit such relative movement thereof as might be necessary under various conditions of use. The means which I employ to effect this adjustment comprehends a frame-supporting lever 14, fulcrumed upon or below the shaft 1 at its center and having its rear end divided or bifurcated and bolted or otherwise secured to a transverse rake-bar 15, extending across the frame at a point slightly removed from its rear end. The front extremity of the lever 14 is upturned, as indicated at 16, and is passed upwardly through the main frame 3 for connection, as by a link 17, with a frame-adjusting lever 18 fulcrumed at a point adjacent to the seat 4—as, for instance, upon the seat-supporting bracket 19—and provided with a spring-latch 20, designed to engage a segmental rack 21, also carried by the bracket 19, for the purpose of retaining the frame-adjusting lever 18 in its various adjustments, and thereby establishing such relation between the two frames as may be desired by the operator or driver.

Between the side bars 9 at a point adjacent to the rear end of the tilting frame is journaled what may be termed a "transverse cutter-shaft" 22, upon which are mounted a series of spaced circular cutters or saws 23, retained in equidistant relation by intermediate spacers 24. It is necessary, of course, to provide for the rotation of the cutters with the shaft and for the removal of said cutters in order to permit the sharpening of the saws or repairs of other nature. I therefore provide the shaft 22 with a spline or feather 25 to connect the saws and spacers with the shaft in a manner to compel their rotation and to permit the shaft to be drawn endwise from the series of cutters and spacers when the disassociation of these parts is made necessary. The shaft 22 and its cutters or saws are rotated at a comparatively high rate of speed by the shaft 1 through an intermediate train of gearing comprising a sprocket-pinion 26, directly geared to a comparatively large sprocket-wheel 27 through an intermediate sprocket-chain 28. The sprocket-wheel 27 is mounted upon a short stud-shaft 29, projecting from the side of the frame, and upon said shaft is mounted for movement with the sprocket 27 a sprocket-pinion 30, geared by a sprocket-chain 30ª with a sprocket-wheel 31, keyed upon the outer end of the shaft 1, the adjacent outer extremities of the shafts 1 and 29 being retained by a suitable bearing-bracket 32, carried by one of the frame-bars 9.

Immediately in advance of the cutter-shaft 22 is journaled in suitable bearings a picker-shaft 33, upon which is keyed or otherwise secured a rotary picker, comprising a picker-roll 34, formed with a series of equidistant annular grooves or channels 35, into which the teeth of the saws extend. Adjacent to each of the annular channels 35 the picker-roll is provided with a circumferential series of radial picker-teeth 36, which have pointed ends and are longitudinally curved to permit them to more readily pick up the vines or other vegetation and convey them to the knives. This operation is greatly facilitated by the provision of a series of vertically-disposed rake-teeth 37, having their upper ends or shanks bolted or otherwise secured to the rake-bar 15. Each of these teeth extends downwardly between a pair of saws and immediately adjacent to a series of picker-teeth, which latter move in a plane between a rake-tooth and an adjacent saw, so that as the vegetation is caught up by the forwardly-curved lower ends 38 of the rake-teeth it will be quickly engaged by the picker-teeth and carried upwardly in the direction of the saws, the rake-teeth serving to insure the delivery of the stalks between the peripheries of the rotary cutters and picker-roll. Rotary motion is imparted to the rotary picker in any suitable manner—as, for instance, by keying a sprocket-pinion 39 upon the end of the picker-shaft opposite the pinion 26 of the cutter-shaft and geared, as by a sprocket-chain 40, with a comparatively large sprocket-wheel 41, keyed upon the adjacent extremity of the shaft 1.

Having thus described the construction of my machine the operation thereof may be defined as follows: The prunings, stalks, or other vegetation designed to be cut to facilitate their use as a fertilizer are first strewn over the ground—as, for instance, between the rows of vines in a vineyard. The machine is then drawn between the rows and the prunings are caught upon the points of the rake and are lifted until they are brought within the path of movement of the picker-teeth. The latter then serve to insure the positive presentation of the stalks between the cutters and picker-roll, which coöperating elements are rotating in opposite directions. Therefore as the picker-teeth move upwardly the contiguous saw-teeth are moving downwardly and effectually sever the stalks and permit them to drop back to the ground as the short lengths between the saws are turned endwise by the further upward movement of the picker-teeth after the cutting operation.

The rollers 12 support the rear end of the frame and serve to prevent the rake-teeth from being caught in the ground in the event of unevenness of the surface, and the clutch-lever 8, as stated, serves to throw the shaft 1 into and out of gear with the wheels 2 when it is desired to commence or discontinue the operation of the machine, as the case may be. At the same time the machine may be nicely balanced through the adjustment of the frames by the manipulation of the lever 18, and the tilting frame may be entirely lifted from the ground—as, for instance, when turning—by drawing back the lever 18 to a sufficient extent.

From the foregoing it will appear that I have produced a simple, durable, and effective brush-cutting machine embodying a construction best calculated to effect the accomplishment of the several objects stated; but while the present embodiment of my invention is believed at this time to be preferable it is evident that many changes of both form and arrangement may be resorted to without departure from the spirit of the invention. I therefore reserve the right to incorporate such changes, modifications, and variations as are properly comprehended within the scope of the protection prayed.

What I claim is—

1. In a machine of the character described, the combination with a frame, of a series of rotary cutters mounted therein, a series of rake-teeth disposed intermediate of the cutters, and pickers arranged to carry the vegetation up the rake-teeth for presentation to the cutters.

2. In a brush-cutting machine, the combination with a frame and a series of rotary cutters, of rake-teeth extending between the cutters, and a rotary picker provided with picker-teeth extended between the cutters and rake-teeth.

3. In a brush-cutting machine, the combination with a frame, of a series of rotary cutters in spaced relation, a picker-roll in coöperative proximity to the cutters, rake-teeth disposed between the cutters, and picker-teeth extending from the picker-roll and each movable between a rake-tooth and an adjacent cutter.

4. In a brush-cutting machine, the combination with a frame, of a series of coaxial rotary cutters, a picker-roll provided with a series of annular channels receiving the cutters, a series of rake-teeth extending between the cutters and in close proximity to the picker-roll, and a series of picker-teeth extending from the picker-roll adjacent to each annular channel therein and each projecting between a rake-tooth and the adjacent cutter.

5. In a brush-cutting machine, the combination with a frame, of a cutter-shaft mounted therein and provided with a series of spaced circular cutters, a picker-shaft likewise mounted in the frame and provided with a picker-roll having a series of annular channels for the reception of the rotary cutters, a rake-bar extending across the frame above the picker-roll, rake-teeth extending downwardly from said bar between the cutters and having their lower ends curved under the picker-roll, a circumferential series of picker-teeth extending from the picker adjacent to each annular channel, and means for rotating the cutter and picker shafts.

6. In a brush-cutting machine, the combination with a main frame, main shaft and carrying-wheels, of a tilting frame supported upon said shaft, picker and cutting mechanism and a series of rake-teeth carried by the tilting frame, and means carried by the main frame for tilting the tilting frame and for securing the latter in its adjusted positions.

7. In a brush-cutting machine, the combination with a main frame, shaft and bearing-wheels, of a tilting frame, a series of cutters, a rotary picker and a series of rake-teeth grouped in operative relation within the frame, means for tilting said frame, and supporting-rollers carried at the rear end of the tilting frame and designed to prevent the rake-teeth from entering the ground.

8. In a brush-cutting machine, the combination with a main frame, shaft and carrying-wheels, of clutch mechanism for throwing said wheels into and out of connection with the shaft, a tilting frame carried by said shaft beyond the carrying-wheels, a series of equidistant rotary cutters mounted within the frame, a picker-roll provided with annular channels for the reception of the cutters, a rake-bar mounted above the picker-roll, a series of rake-teeth extending from said bar between the cutters and having their lower ends forwardly curved, picker-teeth extending from the picker-roll in planes intermediate of the rake-teeth and cutters, speed-gearing intermediate the cutters and main shaft, means for rotating the picker-roll, and means for elevating and depressing the tilting frame.

9. In a machine of the character described, the combination with a frame, of a series of cutters supported thereby, a series of rake-teeth disposed intermediate of the cutters, and means for carrying the vegetation up the rake-teeth for presentation to the cutters.

10. In a brush-cutting machine, the combination with the main frame, shaft and bearing-wheels, of a tilting frame, a series of cutters, a rotary picker and a series of rake-teeth grouped in operative relation, means for tilting said frame, and supporting means disposed below the frame to prevent the rake-teeth from entering the ground.

11. In a brush-cutting machine, the combination with a main frame, shaft, and carrying-wheels, of a tilting frame supported upon said shaft, a series of rotary cutters mounted in the frame, a series of rake-teeth disposed intermediate of the cutters, pickers arranged to carry the vegetation up the rake-teeth for presentation to the cutters, means for simultaneously throwing the cutters and pickers into and out of gear with the carrying-wheels, and means for adjusting the frame.

In testimony that I claim the foregoing as my own I have hereto affixed my signature in the presence of two witnesses.

LOUIS NILSON.

Witnesses:
CHRISTIAN HANSEN SELLING,
CARL SOPHUS SCHOUGAARD.